(12) United States Patent
Atighetchi et al.

(10) Patent No.: US 11,297,081 B2
(45) Date of Patent: Apr. 5, 2022

(54) METHODS AND SYSTEMS FOR ELIMINATING AND REDUCING ATTACK SURFACES THROUGH EVALUATING RECONFIGURATIONS

(71) Applicant: Raytheon BBN Technologies Corp., Cambridge, MA (US)

(72) Inventors: Michael Hassan Atighetchi, Framingham, MA (US); Borislava Ivanova Simidchieva, Arlington, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 352 days.

(21) Appl. No.: 16/444,630

(22) Filed: Jun. 18, 2019

(65) Prior Publication Data
US 2020/0252418 A1     Aug. 6, 2020

Related U.S. Application Data

(60) Provisional application No. 62/801,960, filed on Feb. 6, 2019.

(51) Int. Cl.
*H04L 29/06* (2006.01)

(52) U.S. Cl.
CPC ...... *H04L 63/1425* (2013.01); *H04L 63/1416* (2013.01); *H04L 63/1433* (2013.01); *H04L 63/1441* (2013.01); *H04L 63/20* (2013.01)

(58) Field of Classification Search
CPC ............. H04L 63/1425; H04L 63/1416; H04L 63/1433; H04L 63/1441; H04L 63/20

USPC ......................................................... 709/224
See application file for complete search history.

(56) References Cited

U.S. PATENT DOCUMENTS

| | | | |
|---|---|---|---|
| 2019/0207814 A1* | 7/2019 | Jain | G16H 40/20 |
| 2021/0089647 A1* | 3/2021 | Suwad | G06F 21/577 |

OTHER PUBLICATIONS

Atighetchi et al., "Avoiding common security flaws in composed service-oriented systems," in IEEE/IFIP International Conference on Dependable Systems and Networks Workshops (DSN 2012), 2012, pp. 1-6.
Atighetchi et al., "Using Ontologies to Quantify Attack Surfaces," presented at the Semantic Technology for Intelligence, Defense, and Security (STIDS), Fairfax, VA, 2016.
(Continued)

*Primary Examiner* — Sibte H Bukhari
(74) *Attorney, Agent, or Firm* — Lando & Anastasi, LLP

(57) ABSTRACT

A method of performing a security assessment of a system includes analyzing a static structure of the system; storing, in a semantic system model, structure information about the static structure of the system; observing the system during a plurality of discrete temporal system states; storing, in the semantic system model, dynamic information about the system during the plurality of discrete temporal system states; performing a semantic composition analysis on the structure information to identify at least one vulnerability of the system; performing a flow analysis on the dynamic information to identify at least one anomalous behavior of the system during at least one of the plurality of discrete temporal system states; and generating, based on the at least one vulnerability of the system and the at least one anomalous behavior of the system, a vulnerability assessment of the system.

16 Claims, 9 Drawing Sheets

(56) References Cited

OTHER PUBLICATIONS

Paffenroth et al., "Robust RCA for anomaly detection in cyber networks," arXiv preprint arXiv:1801.01571, 2018.
Candès et al., "Robust principal component analysis?," Journal of the ACM (JACM), vol. 58, No. 3, p. 11, 2011.
Granger, C.W.J., "Testing for causality: a personal viewpoint," Journal of Economic Dynamics and control, vol. 2, pp. 329-352, 1980.
Quinn et al., "Efficient methods to compute optimal tree approximations of directed information graphs," IEEE Transactions on Signal Processing, vol. 61, No. 12, pp. 3173-3182, 2013.
Chen et al., "Towards Automated Dynamic Analysis for Linux-based Embedded Firmware.," in NDSS, p. 1-16, 2016.

* cited by examiner

METHODS AND SYSTEMS FOR ELIMINATING AND REDUCING ATTACK SURFACES THROUGH EVALUATING RECONFIGURATIONS

CROSS REFERENCE TO RELATED APPLICATIONS

This application claims priority under 35 U.S.C. § 119(e) to U.S. Provisional Application Ser. No. 62/801,960, titled "METHODS AND SYSTEMS FOR ELIMINATING AND REDUCING ATTACK SURFACES THROUGH EVALUATING RECONFIGURATIONS (ERASER)," filed Feb. 6, 2019, which is incorporated herein by reference in its entirety.

BACKGROUND

Technical Field

The application generally relates to evaluating systems, including embedded systems and systems-of-systems, for security vulnerabilities.

Background

While static and dynamic analysis of software programs is known, efforts to perform such analysis on embedded systems have been largely unsuccessful. As a result, vulnerability analysis of systems-of-systems that include embedded components remain uneven and incomplete. Such systems, including the firmware running on the embedded devices, are not trivial, and are typically involved in large number of intricate interactions within a system-of-systems. Manual analysis of such systems is error-prone and time-consuming. It is difficult for human operators to foresee all possible contingencies, and humans are vulnerable to biases, preconceptions, and fatigue. Accordingly, such manual approaches do not reliably account for both known and unknown vulnerabilities in the firmware. In any event, manual analysis of firmware involved in a system-of-system, even when conducted by cyber experts, is not feasible in operationally relevant timeframes.

Distributed embedded systems and firmware characteristically pose a challenge for cyber vulnerability assessment (CVA). For example, the inherent diversity of embedded systems, the restricted ability for interrogation and introspection, and the performance constraints (e.g., limited memory, processing, or power) may preclude highly resource-intensive techniques such as model checking from being successfully applied to such systems.

SUMMARY

Scalable solutions for static and dynamic software program analysis of embedded systems are provided that overcome drawbacks of previous approaches. Disclosed embodiments address challenges with innovative techniques that have not been previously applied to firmware and systems of embedded systems. An automated CVA system is disclosed that specifically targets embedded systems and will also work with large-scale systems-of-systems.

These solutions rely on "static" semantic system models that allow for the identification of paths through (and behavior involving) the embedded system and its components. Attack paths can be defined and identified to assist operators with isolating and mitigating security risks. In conjunction with the semantic system model, a dynamic model of the system can be developed. Temporal slices of the system can be used in a flow analysis to detect anomalies, to identify unknown flows, and to identify correlations and causal relationships Using the semantic system model and the dynamic model, vulnerability assessments can be performed, and security risks can be flagged for operators or automatically dealt with according to one or more rules or procedures defined for such risks.

The presently disclosed approach is an improvement over traditional approaches, which focus on source code or binary examination and analysis, and therefore can only be used where the source code or binary is available. By automatically building models through probing and observations of the deployed system, the presently disclosed systems and methods bridge this gap and provide an approach to CVA that is automated and requires only access to the system itself (i.e., not source code, executables, or other resources that may not always be available). That said, the present approach can be considered complementary to traditional source-code or binary firmware analysis approaches, and may be applied alongside such approaches.

According to one aspect, a method of performing a security assessment of a system includes analyzing a static structure of the system; storing, in a semantic system model, structure information about the static structure of the system; observing the system during a plurality of discrete temporal system states; storing, in the semantic system model, dynamic information about the system during the plurality of discrete temporal system states; performing a semantic composition analysis on the structure information to identify at least one vulnerability of the system; performing a flow analysis on the dynamic information to identify at least one anomalous behavior of the system during at least one of the plurality of discrete temporal system states; and generating, based on the at least one vulnerability of the system and the at least one anomalous behavior of the system, a vulnerability assessment of the system.

According to one embodiment, the method includes changing an activation state of at least one component of the system in response to the vulnerability assessment. According to another embodiment, the system is a distributed embedded system comprising firmware. According to yet another embodiment, analyzing the static structure of the system includes at least one of network scanning, interrogation of at least one component of the system, and accessing a system log.

According to one embodiment, analyzing the static structure of the system comprises deploying an artifact in the system. According to a further embodiment, the artifact is an instruction set deployed in an executable component of the system.

According to another embodiment, storing, in the semantic system model, structure information about the static structure of the system is performed responsive to detecting a change in the static structure of the system.

According to one embodiment, observing the system during the plurality of discrete temporal system states is performed during an emulation operation, and the method includes applying at least one input to the system during the emulation operation.

According to a further embodiment, storing, in the semantic system model, the dynamic information about the system during the plurality of discrete temporal system states includes storing at least one output of the system during the emulation operation.

According to one embodiment, performing the semantic composition analysis on the structure information to identify the at least one vulnerability of the system includes constructing an attack vector.

According to another aspect, an evaluation system is provided. The evaluation system includes an interface configured to allow communication between the evaluation system and a target system; a processor; and a memory communicatively coupled to the processor and including instructions that when executed by the processor cause the processor to analyze, via the interface, a static structure of the target system; store, in a semantic system model in the memory, structure information about the static structure of the target system; observe, via the interface, the target system during a plurality of discrete temporal system states of the target system; store, in the semantic system model in the memory, dynamic information about the target system during the plurality of discrete temporal system states; perform a semantic composition analysis on the structure information to identify at least one vulnerability of the target system; perform a flow analysis on the dynamic information to identify at least one anomalous behavior of the target system during at least one of the plurality of discrete temporal system states; and generate, based on the at least one vulnerability of the target system and the at least one anomalous behavior of the target system, a vulnerability assessment of the target system.

According to one embodiment, the evaluation system includes a user interface, wherein the processor is further configured to display information about the vulnerability assessment of the target system to a user. According to another embodiment, the processor is further configured to change an activation state of at least one component of the system in response to the vulnerability assessment. According to yet another embodiment, the target system is a distributed embedded system comprising firmware.

According to one embodiment, the processor is configured to analyze the static structure of the target system by deploying an artifact in the target system. According to a further embodiment, the artifact is an instruction set deployed in an executable component of the target system. According to a still further embodiment, the processor is further configured to observe the target system during the plurality of discrete temporal system states during an emulation operation; and apply at least one input to the target system during the emulation operation.

According to yet a further embodiment, the processor is further configured to store, in the semantic system model, at least one output of the target system during the emulation operation.

According to another aspect, a non-transitory computer-readable medium stores sequences of instruction for performing a security assessment of a system, the sequences of instruction including computer executable instructions that instruct at least one processor to analyze a static structure of the system; store, in a semantic system model, structure information about the static structure of the system; observe the system during a plurality of discrete temporal system states; store, in the semantic system model, dynamic information about the system during the plurality of discrete temporal system states; perform a semantic composition analysis on the structure information to identify at least one vulnerability of the system; perform a flow analysis on the dynamic information to identify at least one anomalous behavior of the system during at least one of the plurality of discrete temporal system states; and generate, based on the at least one vulnerability of the system and the at least one anomalous behavior of the system, a vulnerability assessment of the system.

According to one embodiment, the instructions further instruct the at least one processor to change an activation state of at least one component of the system in response to the vulnerability assessment.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1A:
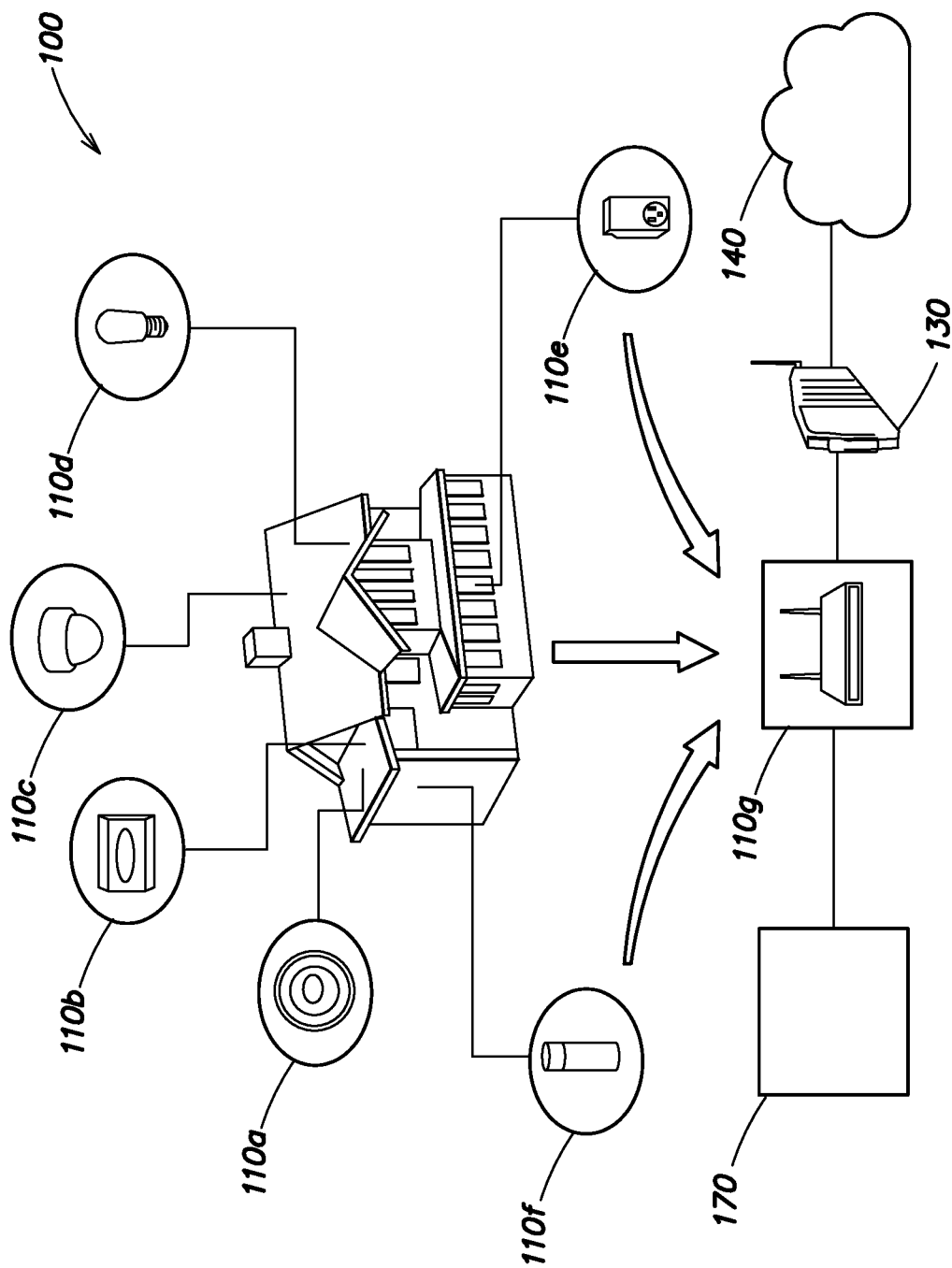
FIG. 1A is a block diagram of a target computer system and an evaluation system according to some embodiments.

The recent proliferation of smart devices has led to the notion of smart homes and cities, where buildings and streets contain sensors working together to provide increased situational awareness (e.g., from cameras, motion sensors, mobile devices such as smartphones, autonomous service robots, and small Unmanned Aircraft Systems or sUAS). The smart home illustrates the complexity and risks of the current state of systems-of-systems containing embedded systems and components, as well as the importance of automated and thorough vulnerability analysis.

Presently disclosed embodiments allow for automated vulnerability analysis by creating high-fidelity integrated semantic system models. Semantic Composition analysis focuses on the static structure of the system model. Applicable attack steps are identified that may lead to system compromise. Attack vectors can be automatically constructed from these steps to identify multi-stage attacks, as well as to identify both known and unknown vulnerability access paths. Resources that are shared among multiple components (e.g., multiple firmware components) may also be analyzed, because such resources are frequently used as entry points by adversaries. Common security paradigms and patterns may also be studied to flag potential vulnerabilities and identify applicable improvements.

The semantic composition model may be created through scanning the system, using system tools to obtain configuration information, and observing network traffic and logs. Each of these techniques is amenable to automation, and allow the model to accurately capture the system behavior and features exposed by the observables. Once these data are collected, they can be intelligently stitched together into a semantic composition model. In some examples, the semantic composition model may be represented as a highly-extensible ontology that supports reasoning and analysis.

In another step, experimentation is performed over an extended period of time in an emulated environment. Many snapshots may be taken of the system state and outputs in response to different inputs. These temporal "slices" of the system can then be used to generate a temporal slicing model. The temporal slices may be provided to granular information-theoretic flow processes for anomaly detection, to identify unknown flows, and to identify correlations and causal relationships. Anomalous behavior is detected by looking for system components that deviate from the automatically constructed model in some way, for example, by responding to the same input with different outputs at different points in time. Missing data flows (i.e., data flows between components that were not seen during the system scan and that were not included in the integrated semantic model) are identified by looking for flows that occur only in some of the slices and at certain time intervals or as result of a certain stimulus. Correlations and causal relationships are identified by analyzing the changes of system state over time to identify if a change in one component dictates a change in another (a causal relationship) or to identify components that always change state together (a correlation).

These models are subsequently scrutinized with two highly complementary analysis approaches that are employed together for more effective embedded system analysis.

FIG. 1A depicts an evaluation system 170 in communication with an example smart home 100 that illustrates the potential security vulnerabilities created by one or more embedded systems or systems-of-systems in devices 110a-g. The smart home 100 includes a heterogeneous mix of devices from various vendors and manufacturers, using different radios and network protocols, and having greatly varying degrees of built-in security. Each of these devices contributes to the overall system's attack surface. For example, the smart home 100 may include devices 110a-d, which may include appliances, wireless speakers, light fixtures, environmental controls (e.g., thermostats), or the like. Additional devices 110e, f may be connected to a smart hub device 110g. The devices 110a-g may communicate over a communication device 130 (e.g., a modem) with other systems via a network 140 (e.g., the Internet).

Any of the devices 110a-g may introduce security vulnerabilities. For example, the devices 110a-g may expose a web server for user administration or a telnet server for vendor debugging access, or may use unencrypted or weakly encrypted communications. The devices 110a-g may run outdated and vulnerable operating systems/firmware, a problem that is exacerbated where the devices 110a-g are located in remote regions where updates are difficult, or by organizations where acquisition takes a long time, and certification and accreditation processes are complex and time consuming.

The communication mechanisms between the devices 110a-g themselves can contribute to the attack surface of a target system. Such devices 110a-g may use protocols such as Z-Wave, Zigbee, Bluetooth, and Wi-Fi, all of which have vulnerabilities that have been uncovered in recent years. Furthermore, the devices 110a-g may be highly configurable, and may be shipped with insecure settings by default and never changed by the user.

Properly configuring and securing any one of devices 110a-g can be a challenge on its own, but securing a composed system of such devices adds significant complexity. The composition of two secure and functional devices is not necessarily itself secure or functional. For example, two devices that in isolation have acceptable properties be vulnerable or non-effective when composed (e.g., the Multicast DNS capability in some Chromecast and Google Home devices can cause complete loss of WiFi in some TP Link routers). Smart home devices may operate in parallel, but may also need tighter integration, using sensor outputs from a set of devices to effect actuation on others (e.g., a door sensor emits an event that the front door opened, which then sets the thermostat to 68 degrees).

In known approaches, vulnerabilities are often overlooked in lower-level software components such as firmware, boot loaders (e.g., UBoot or TianoCore), and any software contained in .bin images that are executed on embedded systems (e.g., the Ardupilot and opensource autopilot software running on the Pixhawk open-hardware platform). Recent technology trends, such as the consolidation of firmware to be Unified Extensible Firmware Interface (UEFI) compliant, have led to significantly more functionality being included in firmware, e.g., remote updating, running of lightweight applications, shell access, etc. This increase in connectedness at the firmware layer together with discrepancies between the UEFI standard and implementation significantly increase the amount of vulnerabilities and an adversary's ability to exploit them.

Figure 1B:
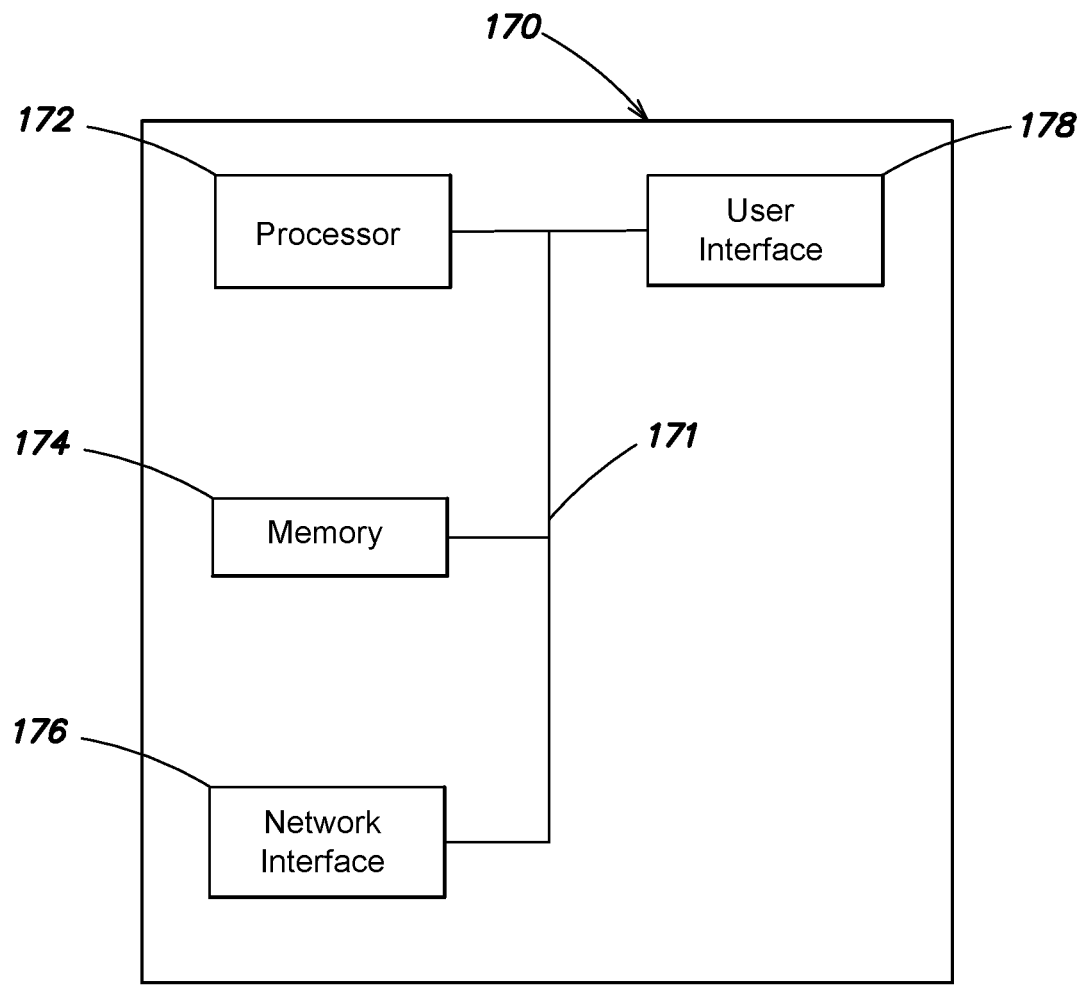
FIG. 1B is a block diagram of an evaluation system according to some embodiments.

The evaluation system 170 is shown in more detail in FIG. 1B. The evaluation system 170 includes a processor 172, a memory 174, a network interface 176, and a user interface 178. The components of the evaluation system 170 may communicate with each other and/or with other components via a communication bus 171 (e.g., a serial bus).

The network interface 176 allows for communication between the evaluation system 170 and the target system 100 using a wired or wireless connection (e.g., Wi-Fi connection). In some embodiments, the network interface 176 may also allow the evaluation system 170 to communicate with external systems, such as to store data gained during an evaluation process in the external system, or to receive programming modules or updates relating to the functionality of the evaluation system 170. In some embodiments, an evaluation protocol for the system 100 may be provided to the evaluation system 170 by an external system via the network interface 176. The network interface 176 and/or the user interface 178 may also allow users or administrators of the evaluation system 170 to communicate with the evaluation system 170, or to access, download, or review results of an evaluation process performed on the system 100.

The processor 172 is configured to execute instructions stored in the memory 174, including instructions for performing the methods of evaluating a system as described herein. As discussed in more detail below, the processor 172 is configured to analyze the target system 100 to build a semantic model of the target system 100. Using the semantic model, the processor 172 can then perform a semantic composition analysis on structure information about the target system 100 to identify vulnerabilities of the target system 100, and can perform a flow analysis on dynamic information about the system 100 to identify at least one anomalous behavior of the target system 100 during at least one discrete temporal system states. The processor 172 can then generate a vulnerability assessment of the system 100 based on the identified vulnerabilities.

The memory 174 may store information from one or more evaluations of the system 100. For example, the memory 174 may store a semantic model of the system that includes structure information about the static structure of the target system, as well as dynamic information about the target system during one or more discrete temporal system states. The semantic model may be stored in a relational database, tuple database, or other type of database.

In some embodiments, the processor 172 may deploy an artifact to the target system 100 that provides some information about the structure or function of the target system 100. The artifact may be stored and accessed in the memory 174 before being deployed by the processor 172, and may be a standalone executable, a software module, a firmware or embedded system component, or an instruction set embedded in other such components.

Figure 2:
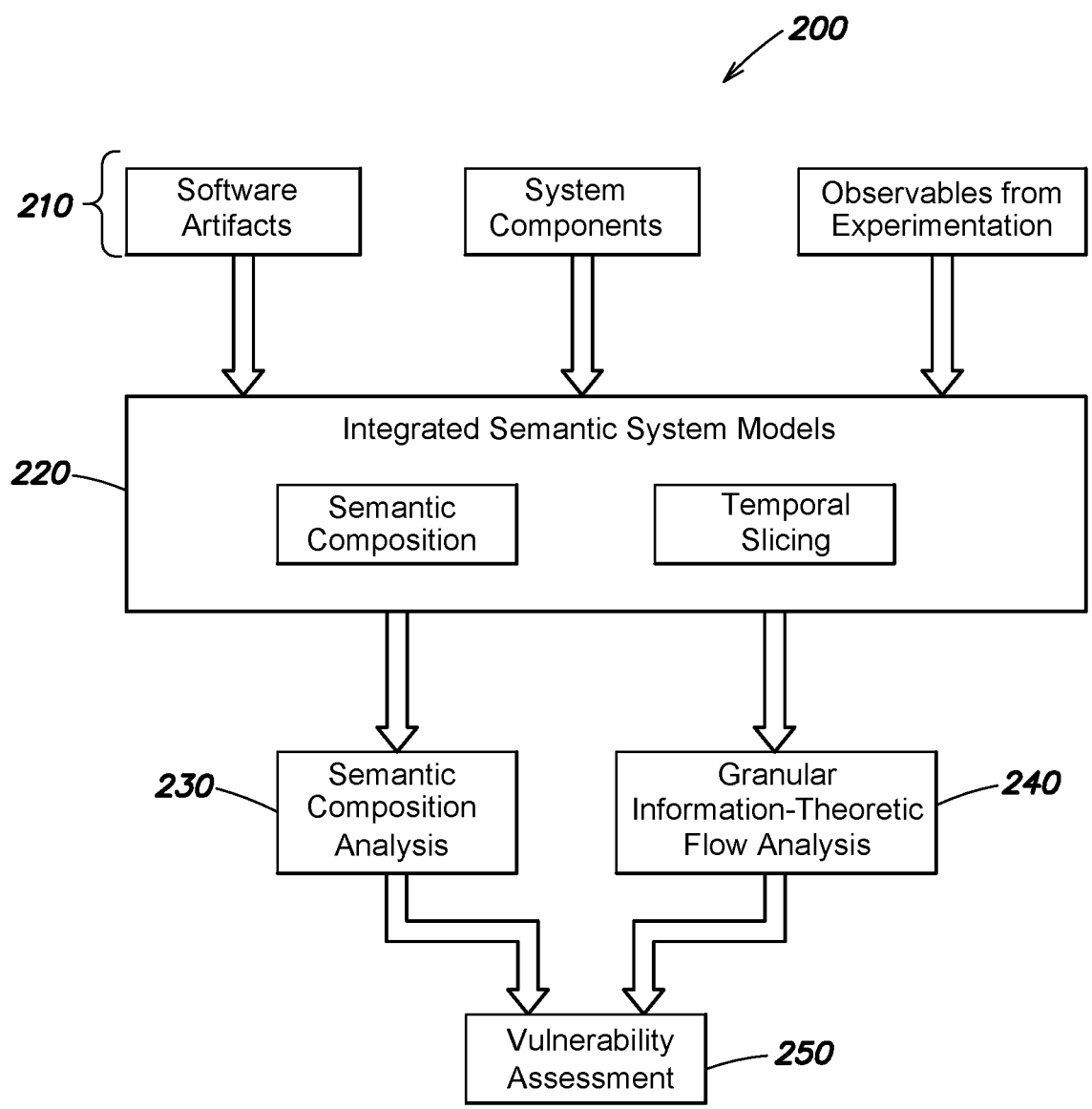
FIG. 2 is a flow diagram of one example of a process of performing a security assessment of a system according to some embodiments.

A flowchart 200 illustrating the operation of systems (e.g., evaluation system 170) and methods disclosed herein according to some embodiments is shown in FIG. 2.

In an act 210, information about the structure and behavior of a system to be assessed is collected. For example, software artifacts may be discovered through the use of scanners. Several different kinds of scanners may be employed to gather different data used in the semantic composition model. Through network scanning and component interrogation and inspection techniques, many partial models of the embedded system's structure and interactions are automatically derived. Through network scanning, all the components on the network can be discovered, and a partial model automatically derived for those entities. Through network traffic collection and analysis, a partial model of the interactions among the different components can be constructed. Finally, through different interrogation scanners, the components found through network scanning can be inspected and their inner structure and workings mapped.

System components may also be identified using system tools. For example, the semantic composition model may include information obtained from using system tools to obtain configuration information.

The structure of the system may be represented by nodes representing each device found on an embedded system and a network of systems, edges representing the static dataflows between the devices, and metadata indicating what internal state about each device was discovered (such as register values, network interfaces, software configuration, etc.).

In particular, experiments can be performed with varying inputs, and the way the embedded system (or system of systems) responds to each set of values can be recorded. Each pair of inputs and outputs as a snapshot at a specific timestamp can be stored until a collection is had.

Furthermore, experiments and tests can be performed on the system in order to record the resulting system state and outputs in response to changing inputs over time.

At act 220, the information obtained in act 210 can be stored in an integrated semantic system model that stores both semantic composition information about the system as well as the temporal slices observed, along with associated metadata. In particular, with the entire system's static structure modeled, a model can be constructed consisting of many snapshots of the system representing its state over time. In particular, experiments can be performed with varying inputs, and the way the embedded system (or system of systems) responds to each set of values can be recorded. Each pair of inputs and outputs as a snapshot at a specific timestamp can be stored until a collection is had.

At act 230, semantic composition analysis may be performed on the static integrated semantic model, and at act 240, a granular information theoretical flow analysis 240 may be performed on the temporal flow information.

The purpose of these experiments and recording system state and outputs in response to changing inputs over time is to construct a temporal slicing model, which represents dynamic behavior over time much more accurately than the static integrated semantic model. Analysis algorithms can use the temporal slicing model to identify anomalies and different relationships. For example, by running experiments in simulation, dataflows between components can be observed in response to different inputs (which could be selected through fuzzing). By analyzing temporal slices, this approach detects flows that occur at some timestamps, but not others, such as the occasional communication between two different components. Anomaly detection could then be performed over all snapshots, allowing for a determination, for example, that a flow had been missing from the integrated semantic model and was not usual (i.e., it only occurred every once in a while). As another example, an anomaly may be detected where two components that interact relatively rarely (e.g., once every 10 minutes) suddenly begin interacting more frequently (e.g., once every two seconds), suggesting that an attack may be underway.

At act 250, a vulnerability assessment can be performed based on the anomalies and other vulnerabilities detected in acts 230 and 240.

As can be seen, there are a number of advantages to studying the system and modeling various aspects of it in separate models at varying levels of abstraction. First, this approach grants deeper understanding of the system architecture and behavior, which in turn means more accurate and actionable vulnerability assessment results. Second, the static and dynamic models present two contrasting but complementary views on the system, each of which allows for different insights to be drawn about the device state and security. The integrated semantic model, with its automatic and structured approach to identifying the underlying architecture of the system, provides a useful dataset for studying the impacts of different attacks and exploring how attack steps can be strung together by an adversary into an attack vector that exploits specific vulnerabilities.

In some embodiments, a relatively small number of high-level attack step types may be considered using the Microsoft STRIDE modeling paradigm. This allows for modeling and studying the specific effects of known and unknown attacks during a vulnerability assessment. Additionally, the architecture and high-level interactions provide an excellent case study for identifying vulnerability patterns such as coupled interactions where one component correctly encrypts all requests to a service, but another component does not, exposing an unsecured channel or overuse of shared resources.

The temporal slicing model is similar to a graph of the integrated semantic model superimposed on itself as many times as there were snapshots recorded. While the temporal slicing model may contain less granular structural information, it contains a plethora of metadata that allows it to capture the state of each device and the entire system at each point in time. Packets being transferred over a network may be collected (as opposed to the integrated semantic model, which just knows that there is a flow between two components), the values of a device's registers (as opposed to the integrated semantic model, which just knows how many registers were found on that device) and their state changes over time, as well as general system "health" information such as logs of system calls and interrupts, memory allocation and deallocation statistics, and various application logs. By running sophisticated statistical analyses over this metadata, anomalous system reactions to specific inputs can be identified, which might indicate a vulnerability. Furthermore, when examined over enough snapshots, a state transition model for embedded components can be inferred, and the probability of certain transitions occurring at any point in time based on their historical occurrences can be identified.

The presently disclosed approach allows correlations and even causal relationships between components to be identified, for example, in systems of systems. A causal relationship means that observing one variable (or process) allows one to better predict the value of another variable (or process). For example, the algorithm might identify that the value of a register in Component A only changes after the value of another register in Component C changes, and that the change in C always triggers that corresponding change in A. Such a pattern would lead the algorithm to determine that there is a causal link originating from C to A.

Figure 3:
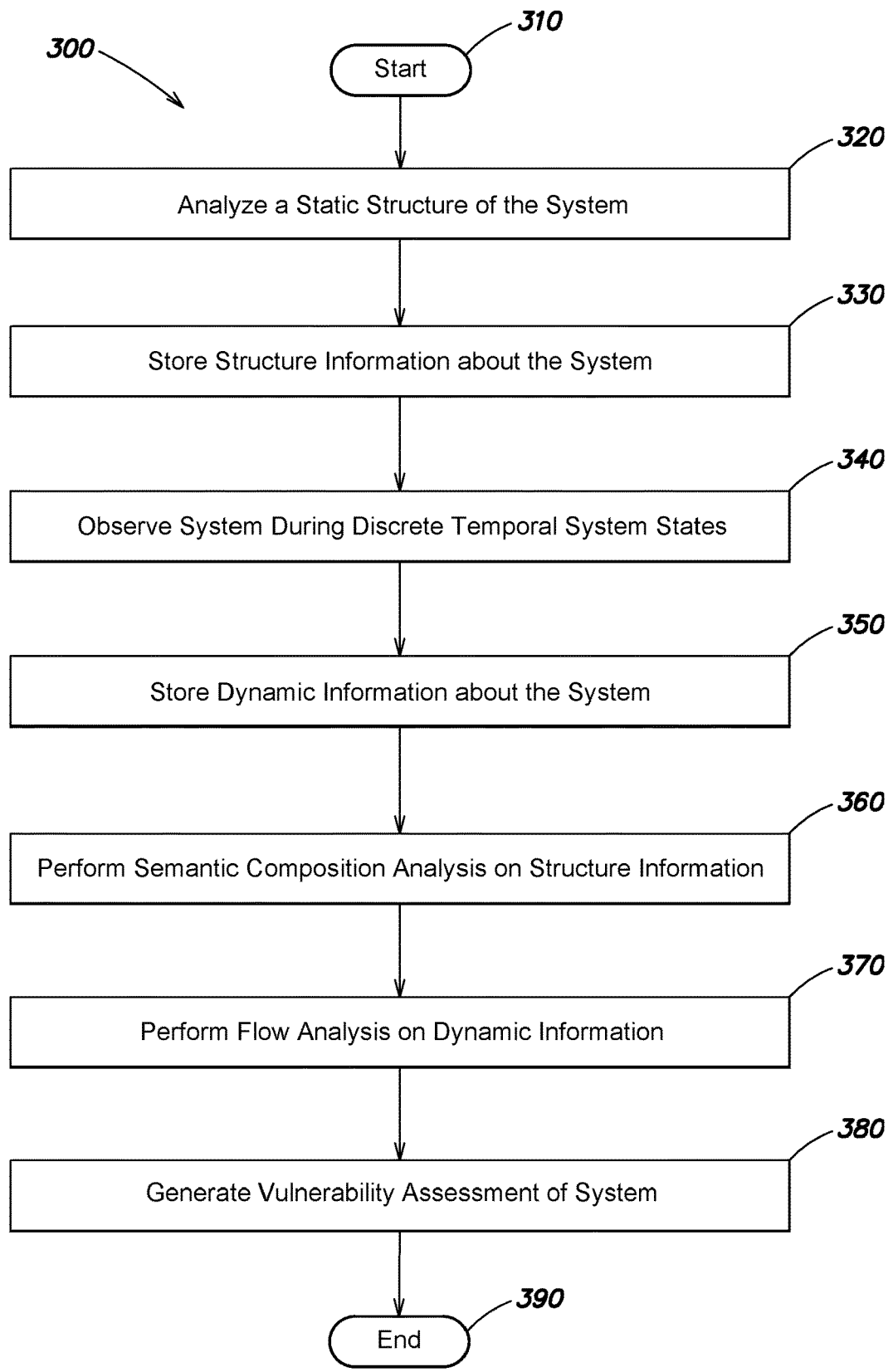
FIG. 3 is a flow diagram of another example of a process of performing a security assessment of a system according to some embodiments.

A method 300 of performing a security assessment of a system is shown in FIG. 3. The method includes acts of analyzing a static structure of the system; storing, in a semantic system model, structure information about the static structure of the system; observing the system during a plurality of discrete temporal system states; storing, in the semantic system model, dynamic information about the system during the plurality of discrete temporal system states; performing a semantic composition analysis on the structure information to identify at least one vulnerability of the system; performing a flow analysis on the dynamic information to identify at least one anomalous behavior of the system during at least one of the plurality of discrete temporal system states; and generating, based on the at least one vulnerability of the system and the at least one anomalous behavior of the system, a vulnerability assessment of the system.

The method 300 begins at step 310.

At step 320, a static structure of the system is analyzed, and at step 330, structure information about the static structure of the system is stored in a semantic system model. Entities such as the processor and memory are modeled, as well as their contents (if available), and the connections/flows among them. A number of high-level constructs may be defined, such as real-time schedulers, real time tasks, device drivers, protocols, and network messages. A survey may be performed across multiple embedded system and firmware instances to capture the common architectural concepts and corresponding firmware and/or runtime constructs and codify them in an ontology for embedded system components. In some embodiments, a semantic web substrate is used for the schema. Semantic web ontologies may provide a suitable representation for addressing the CVA problem in embedded systems due to certain advantages. For example, a semantic web ontology allows for easy querying, reasoning, and inference over the models. These capabilities may be useful in conducting a vulnerability analysis. Furthermore, semantic web representations are mature and standardized.

Example resources included in the system model ontology are shown in the schema of Table 1.

TABLE 1

| Main system model concepts | |
| --- | --- |
| Resource | Description |
| Entity | General concept |
| Boundary | Trust realm for unrestricted access within a boundary |
| Vertical Boundary | subclassOf Boundary describing realm cross layers |
| Horizontal Boundary | subclassOf Boundary describing realm on a single layer |
| Host | subclassOf Vertical Boundary representing a computer system |
| WAN | subclassOf Horizontal Boundary representing a wide area network |
| VLAN | subclassOf Horizontal Boundary representing a wide area network |
| Layer | Logical layering of functionality into three main layers |
| NetworkLayer | subclassOf Layer describing network entities and interactions |
| PhysicalLayer | subclassOf Layer describing physical entities |
| ProcessLayer | subclassOf Layer describing application-level components and interactions |
| DataFlow | Flow of bits between two entities |
| DataStore | Persistent store of information |
| External | An entity that is external to the system |
| User | subclassOf External describing human actors |
| NetworkEndpoint | Sockets used in network connections |
| NIC | Network Interface Card |
| Process | Operating System process |
| Resource | Shared resource with certain capacity |

The embedded system schema may be implemented as a specialization of the existing system schema, and may also incorporate several new concepts. It will be appreciated that while embedded systems may be networked together (and thus, the concepts of Hosts and Network Endpoints are still useful), they have certain aspects which differ from regular computer systems.

In some embodiments, sensors and actuators of embedded systems may be treated as "devices" as discussed herein. For instance, a smart thermostat (e.g., device 110*a* in FIG. 1) may have a temperature sensor and an actuator that turns a furnace on or off. Input from these sensors is used to control the system's behavior, so are incorporated into the embedded system model. In will be appreciated that since firmware is more closely related to the underlying hardware, concepts can be modeled at a finer granularity of detail by modeling subcomponents as devices.

In some embodiments, artifacts may be deployed into the system in order to facilitate the analysis of the static structure of the system. For example, an executable or other instruction set may be deployed in the system, or an instruction set may be deployed in an existing executable component (e.g., firmware).

In some embodiment, a layered approach may be employed, with further extraction of additional detail about the system available at each successive layer. For instance, an embedded system has a processor, which contains a TLB (Translation Lookaside Buffer), a memory cache. However, the existence of, or information about, the TLB for all firmware may not be visible. In this example, the processor concept represents the first layer, and the TLB represents the second layer. In order to construct instances of embedded system models for actual embedded systems, scanning and introspection tools can be leveraged for data collection, and the syntax output can be aligned with the system model ontology mentioned earlier. Both network- and device-level inspection tools can be used. A range of device-specific scanners can be embedded into the firmware and produce models about the firmware's internal structure. The granularity of output generated by scanners can range widely, from general information about OS layout to thread-specific information, e.g., system calls being made. A key difference between embedded devices and other computer systems is that embedded devices often communicate with each other using their own protocols (e.g., Z-Wave and Zigbee), which may not be detectable using these tools.

Following a compositional approach toward model building, each scanner may produce a "partial" ontological model. These partial models form the input to a model stitcher that creates an integrated embedded system model by linking together the various components descriptions and performing co-entity resolution to eliminate duplicate components. For example, a model produced by a tshark scanner may be joined with a model produced by a Python-based device scanner based on overlapping information consisting of an IP address plus port (expressed through a TargetEndpoint).

The semantic system model may be stored in a high-level semantics-based database description that defines a structured formalism for the model. The database may store, for example, the kinds of entities that exist in the application environment, the classifications and groupings of those entities, and the structural interconnections among them. A collection of high-level modeling primitives may be used to capture the semantics of an application environment.

In some embodiments, the static structure of the system may be analyzed periodically or in response to detected events or conditions. For example, steps 320 and/or 330 may be performed in response to detecting that a device has been added to or removed from the system, or in response to a changed configuration or update of a device.

At step 340, the system is observed during a plurality of discrete temporal system states, and at step 350, dynamic information about the system during the plurality of discrete temporal system states is stored in the semantic system model. The system may be monitored using either active and/or passive monitoring techniques. The dynamic information may include relatively large volumes of data describing the detailed run-time behavior of embedded systems with and without attacks, involving full state packet captures and instruction-level device execution traces. Any number of techniques for extracting I/O data and internal state from the firmware components can be used. In one example, code is added to the existing firmware to provide logging, for example, using U-Boot and/or TianoCore.

In some embodiments, the system may be observed during a plurality of discrete temporal system states in an emulation environment. Firmware may be emulated in this manner, as it may be more readily scalable for generating data across a large number of different firmware types used in embedded systems. In yet another example, an emulator that performs virtualization (e.g., QEMU) may generate log files about low-level observables being generated by the virtualization, and may add instrumentation to the code base to log firmware state with increased granularity. In another embodiment, a hardware-in-the-loop design may be employed in which JTAG headers are soldered onto processors, with the hardware being probed using a JTAG/SWD probe via a USB interface.

At step 360, a semantic composition analysis is performed on the structure information to identify at least one vulnerability of the system. The semantic system model (including both static and dynamic information) may be analyzed. Compositions of embedded systems may be examined for vulnerabilities that are present at the architectural level. Often, these vulnerabilities are the result of misconfigurations of parameters, e.g., default settings in embedded systems that sacrifice security for ease of installation and use. A number of methods may be used to analyze configuration for vulnerabilities. For example, definitions of individual adversarial tactics, techniques, and procedures (TTPs) can be developed in the form of attack steps that can be executed against the semantic system model. Using ontological representations and the SPARQL query language, a library of attack steps can be developed following a threat modeling approach, such as the STRIDE approach provided by Microsoft. STRIDE distinguishes attacks by their effect into six independent buckets: Spoofing of user identity, Tampering, Repudiation, Information disclosure, Denial of service, and Elevation of privilege. Given a set of attack steps, the attack vector finding algorithm will compute all applicable attack vectors from a collection of adversarial starting positions.

In another example, formal descriptions of composition patterns, both good and bad, are developed, as are algorithms to analyze existing configurations for the presence of these patterns. Example patterns involve (1) ordering constraints that introduce vulnerabilities, e.g., performing authorization before authentication, (2) usage constraints on shared resources, e.g., unfettered permission to create file descriptors, or (3) non-bypassibility violations of defensive mechanisms, e.g., some hidden data flows leaving embedded systems unencrypted despite the presence of encryption capabilities. Table 2 shows the associated ontology concepts.

TABLE 2

| Attack step ontology | |
|---|---|
| Resource | Description |
| AttackStep | A specific instance of adversarial activity. Attack vectors consists of a collections of linked attack steps. |
| AttackStepDefinition | A reusable generic description of an adversarial activity. Attack steps are derived from definitions |
| AttackVectorElement | Ordering and context around an AttackStep to form an AttackVector |
| AttackVector | Ordered execution of AttackSteps |
| AttackTemplate | A templatized version of an attack vector |
| Attacker | Captures aspects of the expected adversary, including the starting position |
| SideEffect | As part of executing this attack, these specific facts are added to the model |

TABLE 2-continued

Attack step ontology

| | |
|---|---|
| AttackType | The type of attack being executed |
| Spoofing | subclassOf AttackType. Illegally accessing and then using another user's authentication information. |
| Tampering | subclassOf AttackType. Malicious modification of data |
| Repudiation | subclassOf AttackType. Deny performing an action without other parties having any way to prove otherwise |
| InformationDisclosure | subclassOf AttackType. Exposure of information to individuals who are not supposed to have access to it. |
| DenialOfService | subclassOf AttackType. Deny service to valid users |
| ElevationOfPrivilege | subclassOf AttackTypes. An unprivileged user gains privileged access and thereby has sufficient access to compromise or destroy the entire system |

RDF and SPARQL can be used to define the semantics of attack steps.

Table 3 shows an exemplary set of attack steps developed for Attack Vector Finding.

TABLE 3

Example attack steps

| Name | Type | Pre-Condition | Post-Condition |
|---|---|---|---|
| Sniff | Information Disclosure | Access to network | Knowledge about observed network flows |
| PortScan | Information Disclosure | Network reachability | Knowledge about listening sockets |
| TCPConFlood | Denial of Service | Network reachability & Knowledge about the target endpoint | Depletes file descriptors at a given rate |
| OSFingerPrint | Information Disclosure | Knowledge on listening socket on a host | Knowledge about host OS specifics |
| GetRoot | Elevation of Privilege | Knowledge on host OS and listening socket | Root privilege on host |
| ShutDownServer | Denial of Service | Knowledge on host OS and listening socket Root privilege on host | Server unavailable |

An attack-vector-finding algorithm may be employed to efficiently combine the forward and backward search to construct a set of attack vectors, each of which may be partially ordered attack step instances. An attack step instance is an instance of the generic attack step with certain properties bound to specific elements of the system. For a generic attack step to be instantiated, certain constraints may be enforced. For instance, the start and target endpoints may be required to have the right characteristics, such as type, connectivity, resources, and vulnerabilities. In particular, all requirements of a step must hold throughout the execution of that step. A partially ordered attack vector V is represented as a set of vector elements each containing a step instance and a step number. Vector elements with the same step number in layer X represent the steps in layer X of the vector.

The attack vector finding process will switch between forward and backward search to navigate through the exponential search space through four phases.

Figure 4:
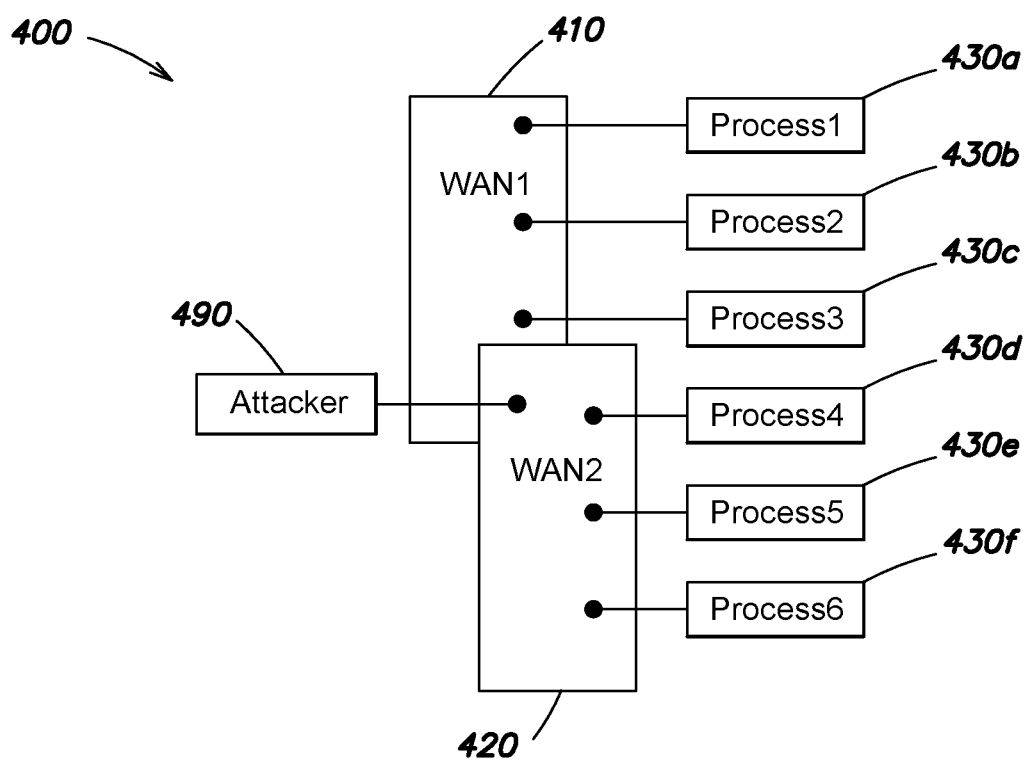
FIG. 4 is a block diagram of a target computer system according to some embodiments.

FIG. 4 illustrate a system 400 on which an attacker 490 may be attempting to cause a Denial of Service (DOS) at Process. The attacker may have access to two wide area networks (WANs) 410 and 420, with only WAN 420 giving him access to one or more processes 430d-f. In this scenario, the attacker 490 may be able to perform three types of steps: two reconnaissance steps to Sniff or Probe the WANs 410 and 420 for information gain, and a TCPFlood step for causing a DOS attack of system 400.

The phases of an attack vector finding process that may be used in this example are shown in FIGS. 5-8.

Figure 5:
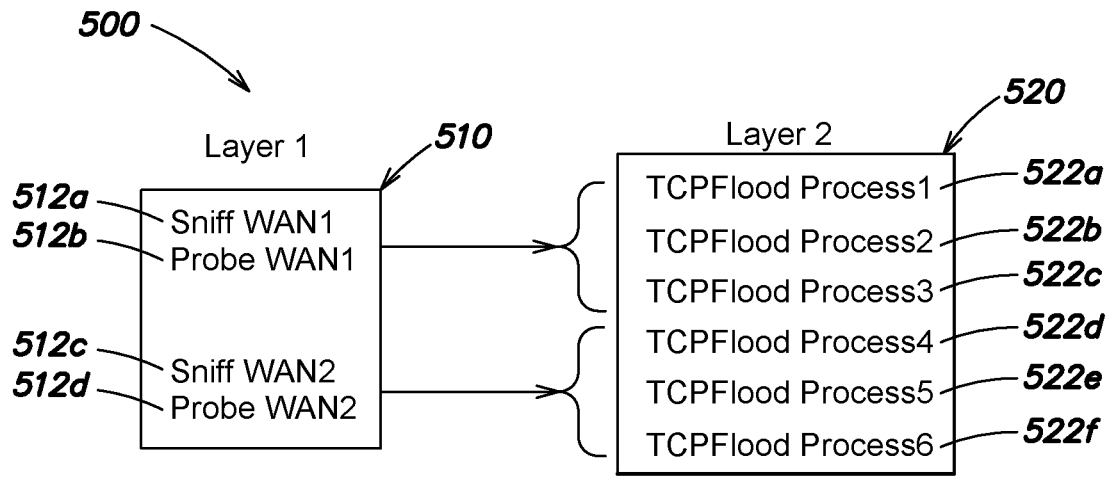
FIGS. 5-8 illustrate phases of an attack vector finding process according to some embodiments.

Expansion phase 500 is shown in FIG. 5. In expansion phase 500, all applicable steps in each layer are found. This phase implements forward search, with two layers 510 and 520 produced at the end of expansion step. The steps 512a, b in layer 510 enable steps 522a-c in layer 520, and steps 512c, d enable steps 522d-f. In general, a first step (e.g., 512a) enables a second step (e.g., 512d) if the first step's side effect satisfies the second step's precondition and the first step is in a layer before the layer that contains the second step.

Figure 6:
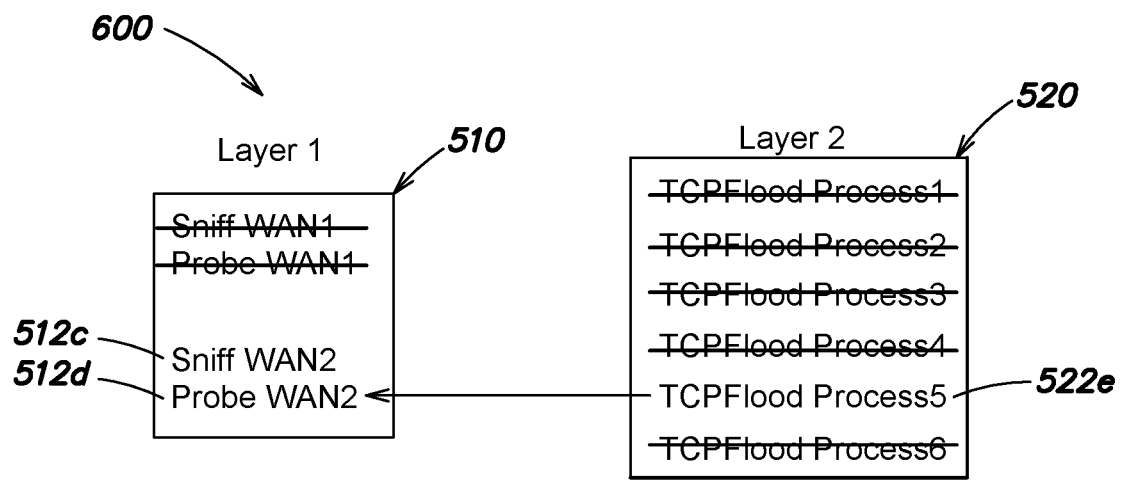

Goal extraction phase 600 is shown in FIG. 6. In goal extraction phase 600, steps that do not support the goal (i.e., the vulnerability) are pruned. This phase implements backward search. For example, where the goal of the attacker 490 in FIG. 4 was a DOS attack on process 430e, the steps that do not lead to that goal are pruned in goal extraction phase 600, resulting in a a partial order vector with multiple enablers of the goal step.

Figure 7:
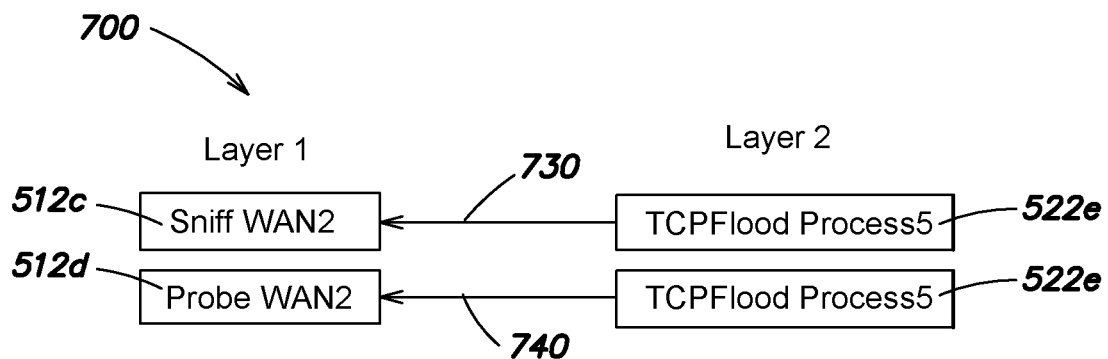

Vector extraction phase 700 is shown in FIG. 7. In vector extraction phase 700, the minimal number of steps necessary to support the goal steps is identified. This phase implements backward search. For example, a vector 730 can be seen from process 430e to step 512c, and another vector 740 can be seen from process 430e to step 512d. These vectors can be envisioned as different multiple vectors with different subset of enabling steps for TCPFlood.

Figure 8:
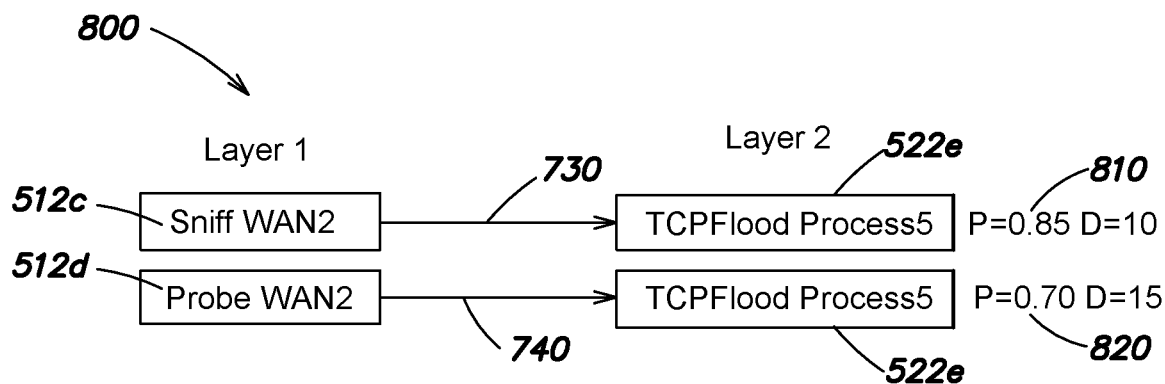

A vector evaluation phase 800 is shown in FIG. 8. In vector evaluation phase 800, the duration and probability of success of the found vectors 730 and 740 is computed given deployed defenses. This phase implements forward search. FIG. 8 shows that given the duration of the vectors and the defenses deployed, the vectors 730 and 740 will have different probabilities 810 and 820 of success of 85% and 70%, respectively.

As a complement to attack vector finding, pattern recognition algorithms are also implemented to spot architectural vulnerabilities in embedded systems-of-systems. By analyzing the architecture for composition patterns, the present approach can identify systemic vulnerabilities independent of the specific code artifact being used to implement the system. Such composition patterns may include coupling (describing interactions between components that have low cohesion); shared resources (dealing with components that need to be treated together); separation (aspects that need to be kept separate); ordering (functions that need to be performed in a certain order); secrets (information that needs to remain hard to guess); and residuals (vulnerabilities that remain despite defenses being added).

These properties and patterns can be described in terms of constraints over system models. For example, when processing user-supplied data, ordering-related issues might different forms. First, if the software performs authorization before authentication, an adversary can essentially pretend to be someone else and thereby obtain the other person's access (escalation of privilege). Second, performing extensive checks on unauthenticated data creates an opportunity for adversaries to consume scarce compute resources on the target, e.g., causing a denial-of-service attack by establishing and holding a TCP connection (via slow-reads), causing the server to set aside socket resources before the user is properly authenticated. Similarly, separation issues frequently occur in embedded systems where isolation boundaries typically found in common operating systems, e.g., isolation of virtual memory across processes, are non-existent. Compromise of a real-time task processing sensor input can easily lead to compromise of the whole operating system.

The integrated system model and automatically derived attack vectors can be used to identify resources that are shared amongst embedded system components (e.g., a memory bus) or amongst embedded systems in a system of systems scenario (e.g., a data link). Shared resources are at the core of many attacks—they can be overused during denial-of-service, corrupted during privilege escalation, or used to for modulation during information disclosure attacks.

At step 370, a flow analysis is performed on the dynamic information to identify at least one anomalous behavior of the system during at least one of the plurality of discrete temporal system states. The objective of the flow analysis is threefold: (1) to study the consequences of different inputs on the behavior of embedded components and systems, (2) to use different anomaly detection mechanisms as a proxy for identifying vulnerabilities, and (3) to apply machine-learning and inference algorithms to identify correlation and causation relationships between embedded components to identify exploitation of vulnerabilities and their propagation through a system of embedded systems.

In some cases, different classes of vulnerabilities may not be of equal concern to the defender. For example, it may be a greater risk to allow an embedded device storing mission-critical archival information to remain vulnerable to data exfiltration than to an availability attack. In a situation where the embedded device contains no protected data, but is required to perform a specific task continuously, the opposite may be true. For example, where a first attack vector is focused on DOS attacks that merely impact availability, that vector may be assigned a lower priority that a second attack vector that impacts the resource's data confidentiality and/or integrity through an impersonation attack, which should be dealt with as a highest priority. In this manner, user preferences can be incorporated into an attack vector finding in order to prioritize attacks that the end user cares about as quickly and intuitively as possible.

To illustrate how such a preference model might be used in the presently disclosed systems and methods for assessing vulnerabilities, consider a very simple interaction scenario in which an external user interacts with a device (e.g., device 110*f* in FIG. 1) in the smart home 100 of FIG. 1. The user's cell phone connects through the smart hub 110*h*, another embedded device, which directly exposes an attack surface to the Internet 140 at large. From an information-theoretic stance, this interaction forms an exchange of information with bits being produced by the smartphone and directed to the device 110*f* for execution. The smart hub 110*h* has built-in security functions that can impact the relationship between inputs and output. In particular, the following transformations that impact the security of the attack surface have been identified: pass-through (the smart hub 110*h* passes the content to another component without significant computation, e.g., forwarding requests); filtering (the smart hub 110*h* drops certain requests, e.g., by performing deep packet inspection); sanitization (the smart hub 110*h* regenerates the inputs from scratch, e.g., terminating and reestablishing sessions and connections); auditing (the smart hub 110*h* creates audit records about interactions, e.g., by communicating with the file system or a log server); and transformation (the smart hub 110*h* computes a function over multiple inputs to produce an output, e.g., providing cached responses).

In some configurations, the smart hub 110*h* may be configured to manipulate or even censors the inputs from the cell phone, resulting in a smaller attack surface and a more favorable vulnerability assessment. In other configurations, the smart hub 110*h* may merely log the external user's inputs or pass them through unchanged, resulting in a larger attack surface and a less favorable vulnerability assessment. The first step is therefore to automatically determine what transformation functions are applicable for a given device within a deployment. Such functions may include, for example, passthrough, sanitization, auditing, and filtering. Defining these functions allows the system to reason about the value of information and identify behaviors and vulnerabilities that the user has indicated are of the highest priority. Since the user preference above indicated that impersonation was of the highest priority, one can reason that an impersonation attack would most likely trigger the auditing or sanitization responses. Those responses can therefore be assessed more closely and prioritized.

At step 380, a vulnerability assessment of the system is generated based on the at least one vulnerability of the system and the at least one anomalous behavior of the system. Device behavior may be analyzed over time using Robust Principal Component Analysis (RPCA) to detect anomalous behavior and infer potential vulnerabilities in the embedded device.

As discussed, analysis of how an embedded device (or a system of embedded devices) operates, irrespective of whether the actual device or its model is being analyzed will involve both static and dynamic (i.e., temporal slice) data, and may include multiple layers of abstraction. At a high level of abstraction, an embedded system snapshot might contain information like CPU utilization, memory utilization, and number of running processes. At lower levels of abstraction, a snapshot might include more detailed information specific to the firmware being modeled, including the exact system calls that were made, and the state of various devices that the firmware interacts with (e.g. I2C buses, GPIO pins, etc.)

Some of these variables are likely to be interdependent and individual variables are likely to have well-defined behavior over time under normal operation. For example, one might expect a strong positive correlation between the number of running processes and CPU utilization on the embedded device. If any of these relationships are linear in nature, for example, then the vulnerability assessment may conclude that an anomaly has been detected. The vulnerability assessment may include taking a matrix containing many samples of the numerous variables in the model and producing a smaller set of linearly independent variables that are a weighted function of the original variables. This low-dimensional output may be used as a preprocessing step or input for other anomaly detection algorithms, which look for outliers in the dimensionality of the output over time.

The method 300 ends at step 390.

Example Computer Implementations

Processes described above are merely illustrative embodiments of systems that may be used to execute security operations. Such illustrative embodiments are not intended to limit the scope of the present disclosure, as any of numerous other implementations exist for performing the disclosure. None of the claims set forth below are intended to be limited to any particular implementation of protecting service-level entities in a distributed computer system, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C #, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present disclosure discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present disclosure.

Various embodiments according to the disclosure may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to partially or fully automate extending offers to users and redeeming offers according to various embodiments of the disclosure. Further, the software design system may be located on a single computer or may be distributed among a plurality of computers attached by a communications network.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. A computer system may be also implemented using specially programmed, special purpose hardware. In a computer system there may be a processor that is typically a commercially available processor such as the well-known Pentium class processor available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, Linux, MAC OS X Snow Leopard, MAC OS X Lion operating systems available from Apple Computer, the Solaris Operating System available from Oracle Corporation, iOS, Blackberry OS, Windows 7 Mobile or Android OS operating systems, or UNIX available from various sources. Many other operating systems may be used.

Some aspects of the disclosure may be implemented as distributed application components that may be executed on a number of different types of systems coupled over a computer network. Some components may be located and executed on mobile devices, servers, tablets, or other system types. Other components of a distributed system may also be used, such as databases or other component types.

The processor and operating system together define a computer platform for which application programs in high-level programming languages are written. It should be understood that the disclosure is not limited to a particular computer system platform, processor, operating system, or network. Further, it should be appreciated that multiple computer platform types may be used in a distributed computer system that implement various aspects of the present disclosure. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). Certain aspects of the present disclosure may also be implemented on a cloud-based computer system (e.g., the EC2 cloud-based computing platform provided by Amazon.com), a distributed computer network including clients and servers, or any combination of systems.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C # (C-Sharp). Other object-oriented programming languages may also be used. Alternatively, functional, scripting, and/or logical programming languages may be used. Various aspects of the disclosure may be implemented in a non-programmed environment (e.g., documents created in HTML, XML or other format that, when viewed in a window of a browser program, render aspects of a graphical-user interface (GUI) or perform other functions). Various aspects of the disclosure may be implemented as programmed or non-programmed elements, or any combination thereof.

Further, on each of the one or more computer systems that include one or more components of distributed system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 9:
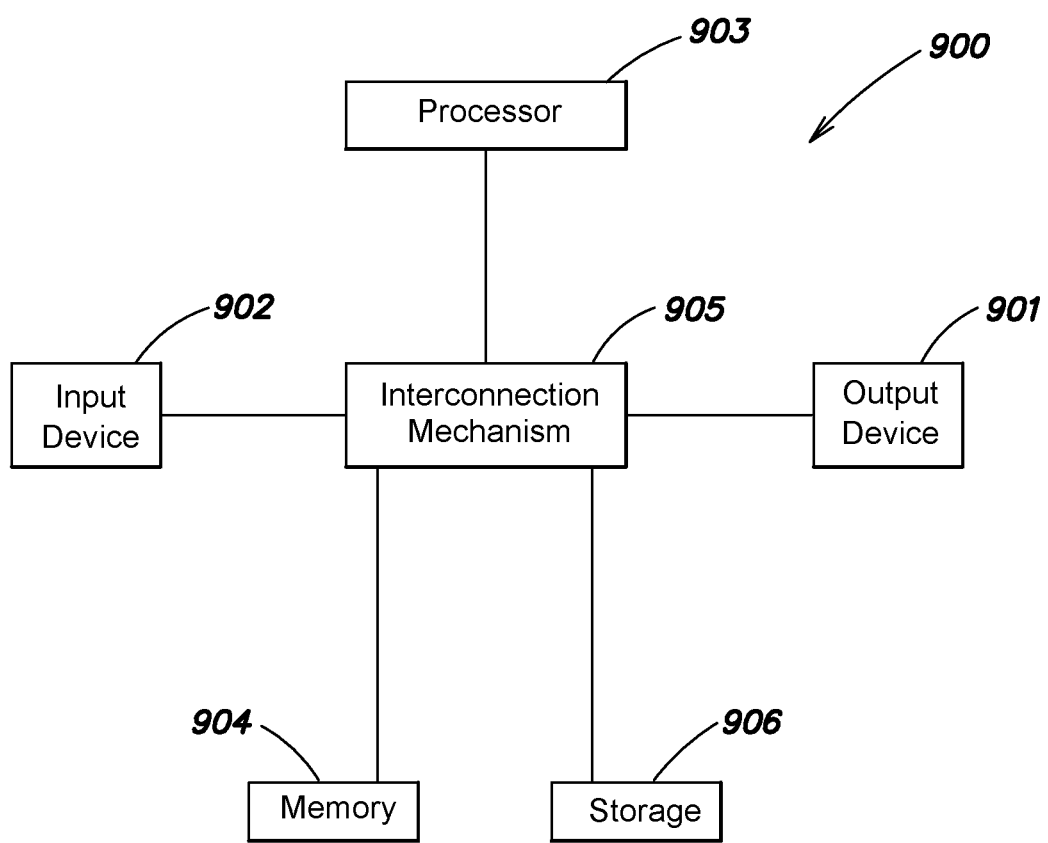
FIG. 9 is a block diagram of one example of a computer system on which aspects and embodiments of the present disclosure may be implemented.
Figure 10:
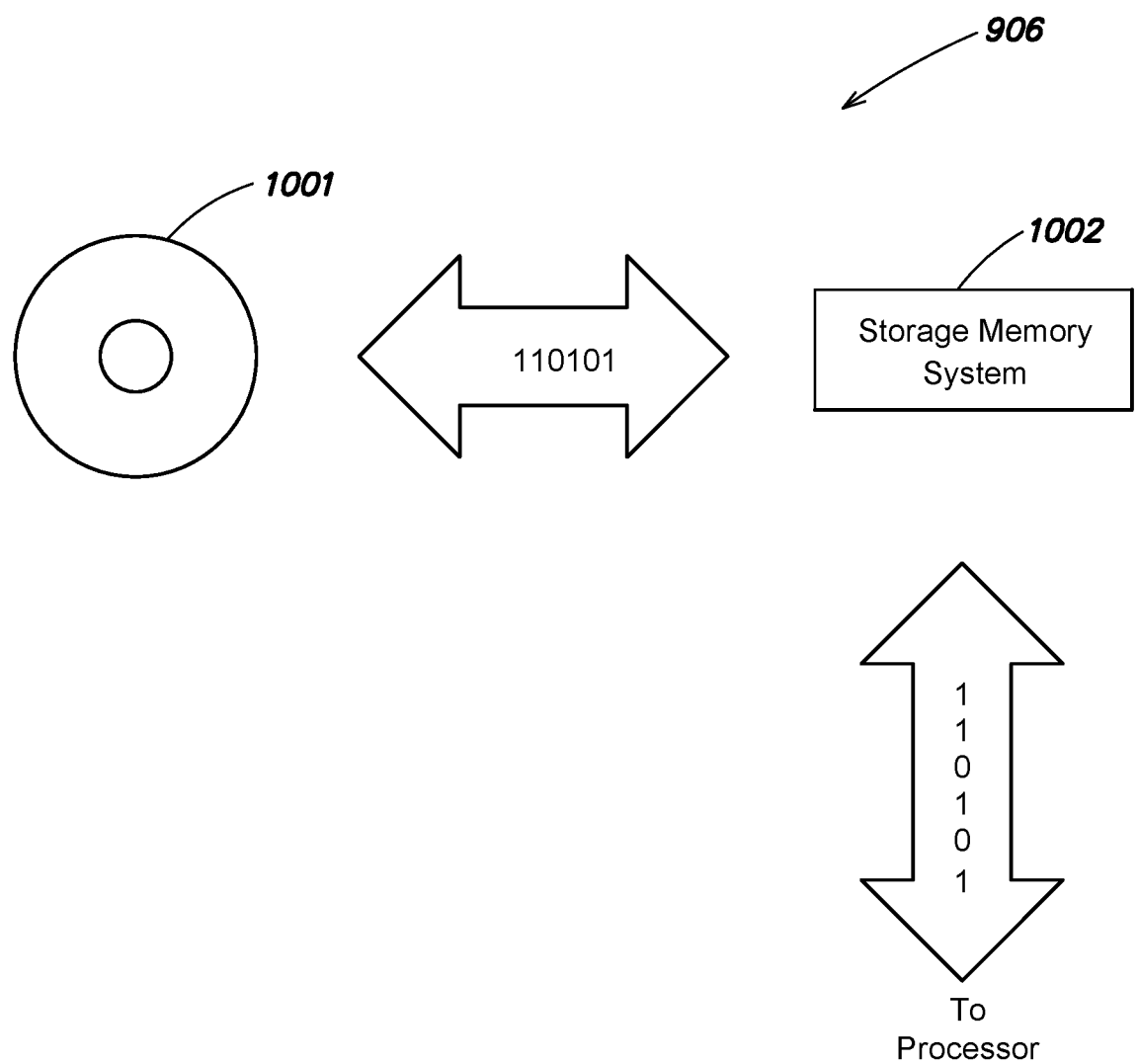
FIG. 10 shows an example storage system capable of implementing various aspects of the present disclosure.

The presently disclosed systems and methods may be implemented on a computer system described below in relation to FIG. 9. In particular, FIG. 9 shows an example computer system 900 used to implement various aspects. FIG. 10 shows an example storage system that may be used.

System 900 is merely an illustrative embodiment of a computer system suitable for implementing various aspects of the disclosure. Such an illustrative embodiment is not intended to limit the scope of the disclosure, as any of numerous other implementations of the system, for example, are possible and are intended to fall within the scope of the disclosure. For example, a virtual computing platform may be used. None of the claims set forth below are intended to be limited to any particular implementation of the system unless such claim includes a limitation explicitly reciting a particular implementation.

Various embodiments according to the disclosure may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate integration of the security services with the other systems and services according to various embodiments of the disclosure. Further, the software design system may be located on a single computer or may be distributed among a plurality of computers attached by a communications network.

For example, various aspects of the disclosure may be implemented as specialized software executing in a general-purpose computer system 900 such as that shown in FIG. 9. The computer system 900 may include a processor 903 connected to one or more memory devices 904, such as a disk drive, memory, or other device for storing data. Memory 904 is typically used for storing programs and data during operation of the computer system 900. Components of computer system 900 may be coupled by an interconnection mechanism 905, which may include one or more busses (e.g., between components that are integrated within a same machine) and/or a network (e.g., between components that reside on separate discrete machines). The interconnection mechanism 905 enables communications (e.g., data, instructions) to be exchanged between system components of system 900. Computer system 900 also includes one or more input devices 902, for example, a keyboard, mouse, trackball, microphone, touch screen, and one or more output devices 901, for example, a printing device, display screen, and/or speaker. In addition, computer system 900 may contain one or more interfaces (not shown) that connect computer system 700 to a communication network (in addition or as an alternative to the interconnection mechanism 905).

The storage system 906, shown in greater detail in FIG. 10, typically includes a computer readable and writeable nonvolatile recording medium 1001 in which signals are stored that define a program to be executed by the processor or information stored on or in the medium 1001 to be processed by the program. The medium may, for example, be a disk or flash memory. Typically, in operation, the processor causes data to be read from the nonvolatile recording medium 801 into another memory 1002 that allows for faster access to the information by the processor than does the medium 1001. This memory 1002 is typically a volatile, random access memory such as a dynamic random-access memory (DRAM) or static memory (SRAM). It may be located in storage system 1006, as shown, or in memory system 1004, not shown. The processor 1003 generally manipulates the data within the integrated circuit memory 1004, 1002 and then copies the data to the medium 1001 after processing is completed. A variety of mechanisms are known for managing data movement between the medium 1001 and the integrated circuit memory element 1002, and the disclosure is not limited thereto. The disclosure is not limited to a particular memory system 904 or storage system 906.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 900 is shown by way of example as one type of computer system upon which various aspects of the disclosure may be practiced, it should be appreciated that aspects of the disclosure are not limited to being implemented on the computer system as shown in FIG. 9. Various aspects of the disclosure may be practiced on one or more computers having a different architecture or components that that shown in FIG. 9.

Computer system 900 may be a general-purpose computer system that is programmable using a high-level computer programming language. Computer system 900 may be also implemented using specially programmed, special purpose hardware. In computer system 900, processor 903 is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 Mobile or Android OS operating systems, or UNIX available from various sources. Many other operating systems may be used.

The processor and operating system together define a computer platform for which application programs in high-level programming languages are written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP).

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C # (C-Sharp). Other object-oriented programming languages may also be used. Alternatively, functional, scripting, and/or logical programming languages may be used. Various aspects of the disclosure may be implemented in a non-programmed environment (e.g., documents created in HTML, XML or other format that, when viewed in a window of a browser program, render aspects of a graphical-user interface (GUI) or perform other functions). Various aspects of the disclosure may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present disclosure may be implemented in a cloud-based computing platform, such as the well-known EC2 platform available commercially from Amazon.com (Seattle, Wash.), among others. Various aspects of the disclosure may be implemented as programmed or non-programmed elements, or any combination thereof.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A method of performing a security assessment of a system, comprising:
analyzing a static structure of the system;
storing, in a semantic system model, structure information about the static structure of the system;
observing the system during a plurality of discrete temporal system states;
storing, in the semantic system model, dynamic information about the system during the plurality of discrete temporal system states;
performing a semantic composition analysis on the structure information to identify at least one vulnerability of the system;
performing a flow analysis on the dynamic information to identify at least one anomalous behavior of the system during at least one of the plurality of discrete temporal system states; and
generating, based on the at least one vulnerability of the system and the at least one anomalous behavior of the system, a vulnerability assessment of the system,
wherein observing the system during the plurality of discrete temporal system states is performed during an emulation operation, further comprising applying at least one input to the system during the emulation operation, and
wherein storing, in the semantic system model, the dynamic information about the system during the plurality of discrete temporal system states comprises storing at least one output of the system during the emulation operation.

2. The method of claim 1, further comprising changing an activation state of at least one component of the system in response to the vulnerability assessment.

3. The method of claim 1, wherein the system is a distributed embedded system comprising firmware.

4. The method of claim 1, wherein analyzing the static structure of the system includes at least one of network scanning, interrogation of at least one component of the system, and accessing a system log.

5. The method of claim 1, wherein analyzing the static structure of the system comprises deploying an artifact in the system.

6. The method of claim 5, wherein the artifact is an instruction set deployed in an executable component of the system.

7. The method of claim 1, wherein storing, in the semantic system model, structure information about the static structure of the system is performed responsive to detecting a change in the static structure of the system.

8. The method of claim 1, wherein performing the semantic composition analysis on the structure information to identify the at least one vulnerability of the system comprises constructing an attack vector.

9. An evaluation system comprising:
a processor;
an interface coupled to the processor and configured to allow communication between the evaluation system and a target system; and
a memory communicatively coupled to the processor and including instructions that when executed by the processor cause the processor to:
analyze, via the interface, a static structure of the target system;
store, in a semantic system model in the memory, structure information about the static structure of the target system;
observe, via the interface, the target system during a plurality of discrete temporal system states of the target system;

store, in the semantic system model in the memory, dynamic information about the target system during the plurality of discrete temporal system states;
perform a semantic composition analysis on the structure information to identify at least one vulnerability of the target system;
perform a flow analysis on the dynamic information to identify at least one anomalous behavior of the target system during at least one of the plurality of discrete temporal system states; and
generate, based on the at least one vulnerability of the target system and the at least one anomalous behavior of the target system, a vulnerability assessment of the target system, wherein the processor is further configured to
observe the target system during the plurality of discrete temporal system states during an emulation operation,
apply at least one input to the target system during the emulation operation, and
store, in the semantic system model, at least one output of the target system during the emulation operation.

10. The evaluation system of claim 9, further comprising a user interface, wherein the processor is further configured to display information about the vulnerability assessment of the target system to a user.

11. The evaluation system of claim 9, wherein the processor is further configured to change an activation state of at least one component of the system in response to the vulnerability assessment.

12. The evaluation system of claim 9, where the target system is a distributed embedded system comprising firmware.

13. The evaluation system of claim 9, wherein the processor is configured to analyze the static structure of the target system by deploying an artifact in the target system.

14. The evaluation system of claim 13, wherein the artifact is an instruction set deployed in an executable component of the target system.

15. A non-transitory computer-readable medium storing sequences of instruction for performing a security assessment of a system, the sequences of instruction including computer executable instructions that instruct at least one processor to:
analyze a static structure of the system;
store, in a semantic system model, structure information about the static structure of the system;
observe the system during a plurality of discrete temporal system states;
store, in the semantic system model, dynamic information about the system during the plurality of discrete temporal system states;
perform a semantic composition analysis on the structure information to identify at least one vulnerability of the system;
perform a flow analysis on the dynamic information to identify at least one anomalous behavior of the system during at least one of the plurality of discrete temporal system states; and
generate, based on the at least one vulnerability of the system and the at least one anomalous behavior of the system, a vulnerability assessment of the system, wherein the instructions further instruct the at least one processor to
observe the system during the plurality of discrete temporal system states during an emulation operation,
apply at least one input to the system during the emulation operation, and
store, in the semantic system model, at least one output of the system during the emulation operation.

16. The non-transitory computer readable medium of claim 15, wherein the instructions further instruct the at least one processor to change an activation state of at least one component of the system in response to the vulnerability assessment.

\* \* \* \* \*